US011635055B2

(12) United States Patent
Dall, Jr. et al.

(10) Patent No.: US 11,635,055 B2
(45) Date of Patent: Apr. 25, 2023

(54) REPLACING A STUB SHAFT BEARING FOR A HYDROELECTRIC TURBINE USING A RUNNER HUB LIFTING DEVICE

(71) Applicant: ANDRITZ HYDRO CORP., Charlotte, NC (US)

(72) Inventors: Anthony Robert Dall, Jr., Concord, NC (US); Wagner Vanci da Silva, Concord, NC (US); Bernard Cantin, Charlotte, NC (US)

(73) Assignee: ANDRITZ HYDRO CORP., Charlotte, NC (US)

( * ) Notice: Subject to any disclaimer, the term of this patent is extended or adjusted under 35 U.S.C. 154(b) by 41 days.

(21) Appl. No.: 17/368,399

(22) Filed: Jul. 6, 2021

(65) Prior Publication Data

US 2023/0008888 A1    Jan. 12, 2023

(51) Int. Cl.
*F03B 11/06* (2006.01)
*F03B 13/08* (2006.01)

(52) U.S. Cl.
CPC .............. *F03B 11/06* (2013.01); *F03B 13/08* (2013.01); *F05B 2240/50* (2013.01); *F16C 2237/00* (2013.01)

(58) Field of Classification Search
CPC .... F05B 2230/70; F05B 2230/80; B23P 6/00; B23P 6/002; F16C 2237/00; F01D 25/285; F03D 80/50; F05D 2230/70
See application file for complete search history.

(56) References Cited

U.S. PATENT DOCUMENTS 10,508,643 B2 * 12/2019 Hansen ................... F03D 15/00
2005/0150095 A1 * 7/2005 Ashar ..................... H02K 15/00
29/426.3

* cited by examiner

*Primary Examiner* — Christopher J Besler
(74) *Attorney, Agent, or Firm* — Kilpatrick Townsend & Stockton LLP

(57) ABSTRACT

The stub shaft bearing for a stub shaft can be replaced while the stub shaft remains installed in a hydroelectric unit. A runner hub lifting device may be positioned within a discharge ring surrounding a runner hub. The runner hub lifting device may lift the runner hub, and a stub shaft bearing may be removed from a stub shaft. The stub shaft bearing may be disassembled into bearing sections while located in a chamber in the hydroelectric unit. The bearing sections may be removed from the chamber through a service hatch in the chamber. A replacement stub shaft bearing may be moved into the chamber and installed on the stub shaft. The runner hub lifting device may lower the runner hub.

4 Claims, 9 Drawing Sheets

REPLACING A STUB SHAFT BEARING FOR A HYDROELECTRIC TURBINE USING A RUNNER HUB LIFTING DEVICE

TECHNICAL FIELD

The present disclosure relates generally to replacing a stub shaft bearing while the stub shaft remains installed in an operational location within a hydroelectric unit. More particularly, but not by way of exclusion, this disclosure relates to lifting a runner hub with a runner hub lifting device and replacing the stub shaft bearing.

BACKGROUND

A hydroelectric turbine converts the energy of flowing water into rotational mechanical energy. A hydroelectric generator converts this mechanical energy into electricity. The hydroelectric turbine includes a runner that rotates as water flows into the turbine. The runner is connected to a stub shaft and to a main shaft. The stub shaft and the main shaft are each supported by a bearing and a bearing support.

At some point, it may become necessary to repair or replace components within the hydroelectric unit, such as a stub shaft bearing. The large size and complexity of components within the hydroelectric unit may lead to difficulties in accessing certain components for repair or replacement. In particular, the physical arrangement of an inclined hydroelectric generator provides limited space to accommodate repairs and thus most repairs require that components be removed from their operational locations for repair or replacement. For example, replacing the stub shaft bearing typically requires removing the stub shaft with the stub shaft bearing attached to the stub shaft, replacing the stub shaft bearing, and then reinstalling the stub shaft and the stub shaft bearing. Requiring the removal of components for repair or replacement can result in extended down time for the hydroelectric unit.

SUMMARY

Some aspects of the present invention enable a more efficient method for replacing a stub shaft bearing and can be performed while the stub shaft remains installed in its operational location within a hydroelectric unit. The method includes installing a runner hub lifting device in the discharge ring surrounding the runner. The runner hub lifting device lifts the runner hub from a first position to a second position to take the load off the stub shaft bearing. While the runner hub is lifted, the stub shaft bearing is removed from the stub shaft. The removal of the stub shaft bearing may include the removal of a bearing retainer, as well as the attachment of riggings to the stub shaft bearing.

The stub shaft bearing may include multiple bearing sections. Once the stub shaft bearing is removed from the stub shaft, it may be disassembled within a chamber within the hydroelectric unit and each section may be removed from the chamber through an opening.

A replacement stub shaft bearing may be moved into the chamber by moving sections of the stub shaft bearing through the opening. The sections may be assembled within the chamber. The stub shaft bearing may be installed onto the stub shaft and the bearing retainer may be reinstalled. After the installation of stub shaft bearing is completed, the runner hub lifting device returns the runner hub to the first position. The runner hub lifting device can then be removed from the discharge ring.

Aspects of the present invention provide a runner hub lifting device that includes one or more base supports mounted to a bottom plate, a ram base plate mounted to an upper end of the base supports, at least one hydraulic ram mounted on the ram base plate, and a hub support plate mounted above the hydraulic rams. The runner hub lifting device is positioned below the runner hub and aligned with the centerline of the runner hub. The hydraulic rams lift the runner hub to the second position. Hub supports may be inserted between the ram base plate and the hub support plate after lifting the runner hub to help support the lifted runner hub.

These and other features, aspects, and advantages of the present disclosure are better understood when the following Detailed Description is read with reference to the accompanying drawings.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

DETAILED DESCRIPTION

Figure 1:
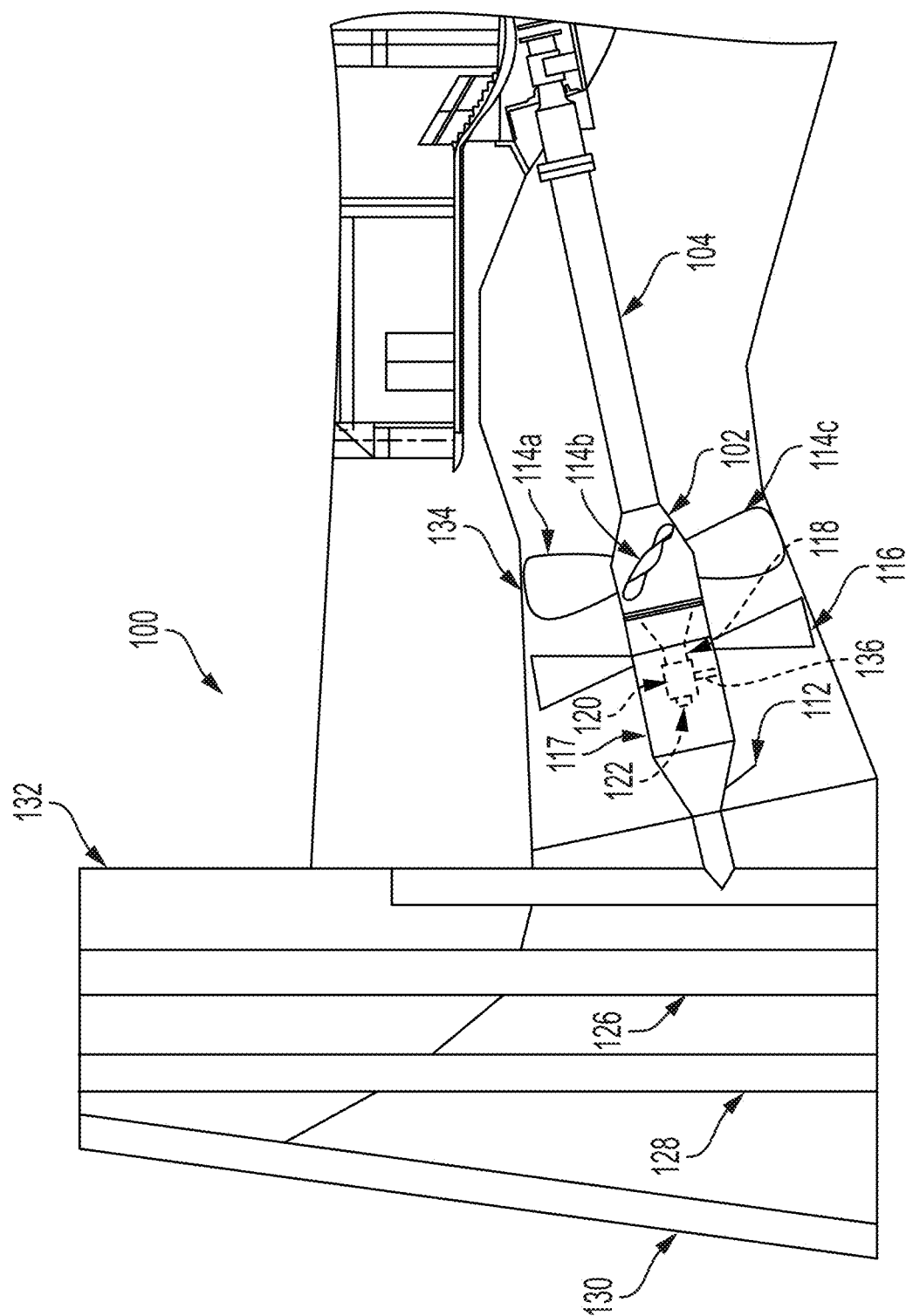
FIG. 1 illustrates a portion of an exemplary hydroelectric turbine.

The following detailed description is presented only for illustrative and descriptive purposes and is not intended to be exhaustive or to limit the scope and spirit of the invention. The examples were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent examples of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

Although specific terms are used in the following description for the sake of clarity, these terms are intended to refer only to the particular structure selected for illustration in the drawings, and are not intended to define or limit the scope of the disclosure.

A hydroelectric turbine may include a runner with runner blades that turn due to water flow. The runner can be connected to a stub shaft located upstream of the runner and to a main shaft located downstream of the runner. Certain components within the hydroelectric generator assembly may require repair or replacement after installation or use. This can include a stub shaft bearing connected to the stub shaft. Access to the stub shaft bearing may be difficult as the load of the hydroelectric turbine is supported by the stub shaft. Existing methods to replace the stub shaft bearing may require disassembly of the runner and stub shaft assembly from the other components. The runner and stub shaft assembly are removed from their operational locations and the stub shaft bearing is removed from the stub shaft. A replacement stub shaft bearing is installed on the stub shaft. The runner and stub shaft assembly are reinstalled within the hydroelectric facility. These existing methods typically require about 12 weeks for removal and disassembly of stub shaft and runner, removal and replacement of the stub shaft bearing, and reassembly and installation of the stub shaft and runner.

Using the methods and structures described herein, the time and cost required to replace the stub shaft bearing can be greatly reduced by using a runner hub lifting device. The runner hub lifting device may be placed beneath a runner hub inside the discharge ring and may use hydraulic rams to lift the runner hub. The runner hub may remain lifted as a new stub shaft bearing is installed onto the stub shaft. Rather than requiring the removal of the entire runner and stub shaft assembly to replace the stub shaft bearing, only the stub shaft bearing may be removed and replaced. In one example, replacing the stub shaft bearing after lifting the runner hub with a runner hub lifting device took less than six weeks.

FIG. 1 is a partial cut-away view of a portion of an exemplary inclined hydroelectric unit 100 with a hydroelectric turbine. The hydroelectric turbine includes an upper shaft 106, a main shaft bearing 108, one or more main shaft bearing supports 110, a lower shaft 104, a runner 102, a stub shaft 118, a stub shaft bearing 120, and a stub shaft bearing support 136. The runner 102 includes a runner hub and runner blades 114a-114d. The runner is located within discharge ring 134. The stub shaft 118, the stub shaft bearing 120, and the stub shaft bearing support 136 are located within chamber 117. Chamber 117 may also be referred to as a vaned intake hub in some installations. The chamber may include an opening or a service hatch 112 that provides access to the interior of the chamber. The main shaft bearing and bearing support and the stub shaft bearing and the stub shaft bearing support provide the primary support for the turbine illustrated in FIG. 1.

The hydroelectric unit may include gates and gate slots, such as an intake gate and intake gate slot 126 and a bulkhead gate and bulkhead gate slot 128, as well as a trash rack guide 130. An intake deck 132 is located above the intake gate slot 126 and the bulkhead gate slot 128. The unit includes a number of other components, including but not limited to an oil head assembly 122 and wicket gates 116.

Runner Hub Lifting Device

Aspects of the present invention allow the stub shaft bearing to be replaced while the stub shaft remains installed in its operational location. The method includes installing a runner hub lifting device in the discharge ring to lift the runner hub and to take the load off the stub shaft bearing.

Figure 2A:
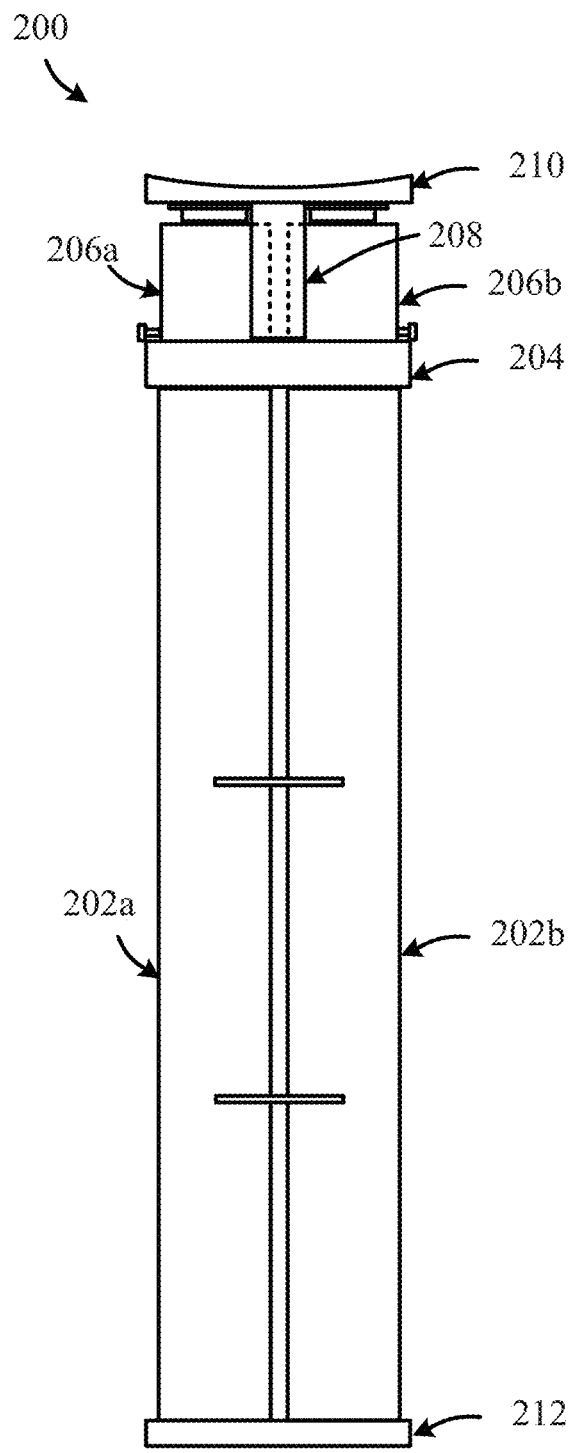
FIG. 2A is a front side view of an exemplary runner hub lifting device.
Figure 2B:
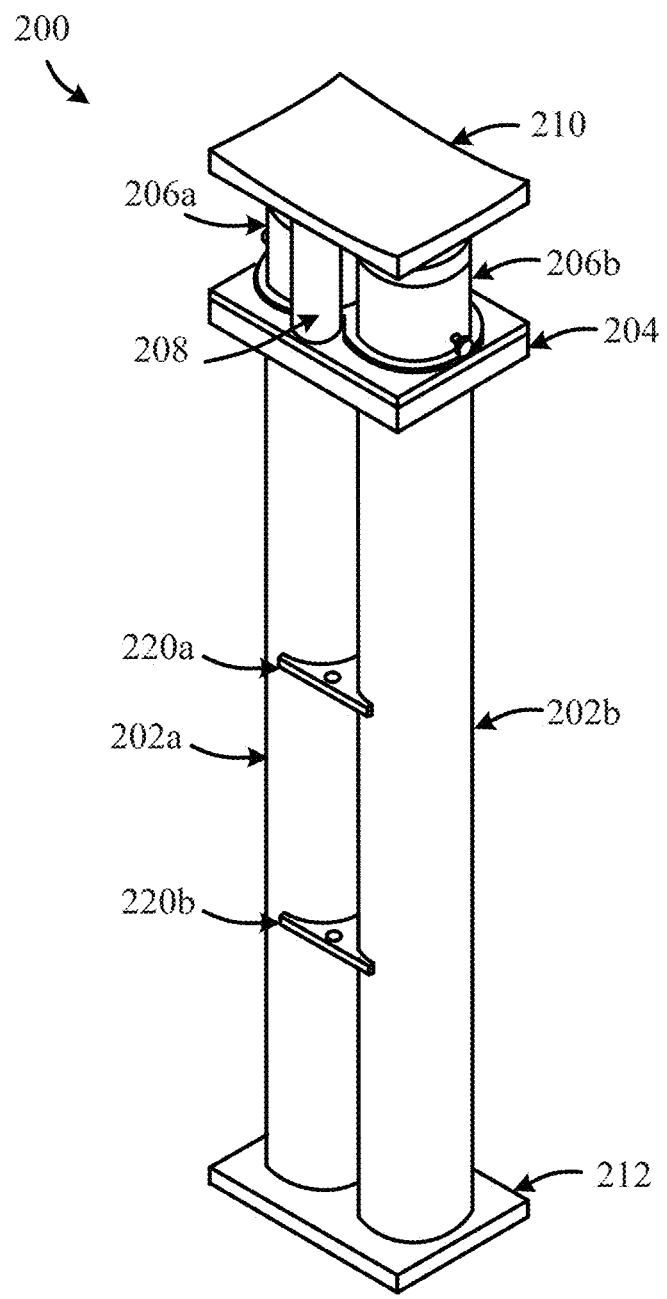
FIG. 2B is a perspective view of an exemplary a runner hub lifting device.

FIGS. 2A and 2B illustrate an exemplary runner hub lifting device 200. The runner hub lifting device 200 includes base supports 202a and 202b, collectively 202, mounted to a bottom plate 212. Gussets 220a, 220b may be located between the base supports. A ram base plate 204 is mounted on top of the base supports 202. Hydraulic rams 206a, 206b, collectively 206, are mounted on top of the ram base plate 204. In one implementation the runner hub lifting device includes two 200 ton rams. A hub support plate 210 is mounted on top of the hydraulic rams 206. The top surface of the hub support plate 210 may be curved to match the curve of the runner hub. The runner hub lifting device 200 may include a hydraulic control system (not shown) that is connected to the hydraulic rams 206 and that provides a user interface for controlling the hydraulic rams 206.

Once the runner hub lifting device lifts the runner, one or more hub supports may be positioned between the ram base plate and the hub support plate. The hub supports may include rods or L-shaped brackets. FIGS. 2A and 2B illustrate a rod-shaped hub support 208 positioned between the ram base plate 204 and the hub support plate 210. In addition, or in the alternative, L-shaped brackets may be positioned at each corner of the ram base plate so that the vertex of the bracket is aligned with the corner and the legs of the bracket extend away from the corner along adjacent edges of the ram base plate.

The runner hub lifting device 200 is not limited to the configuration illustrated in FIGS. 2A and 2B and may include a different number of hydraulic rams 206 and/or base supports 202, or different configurations of the base supports.

Figure 3:
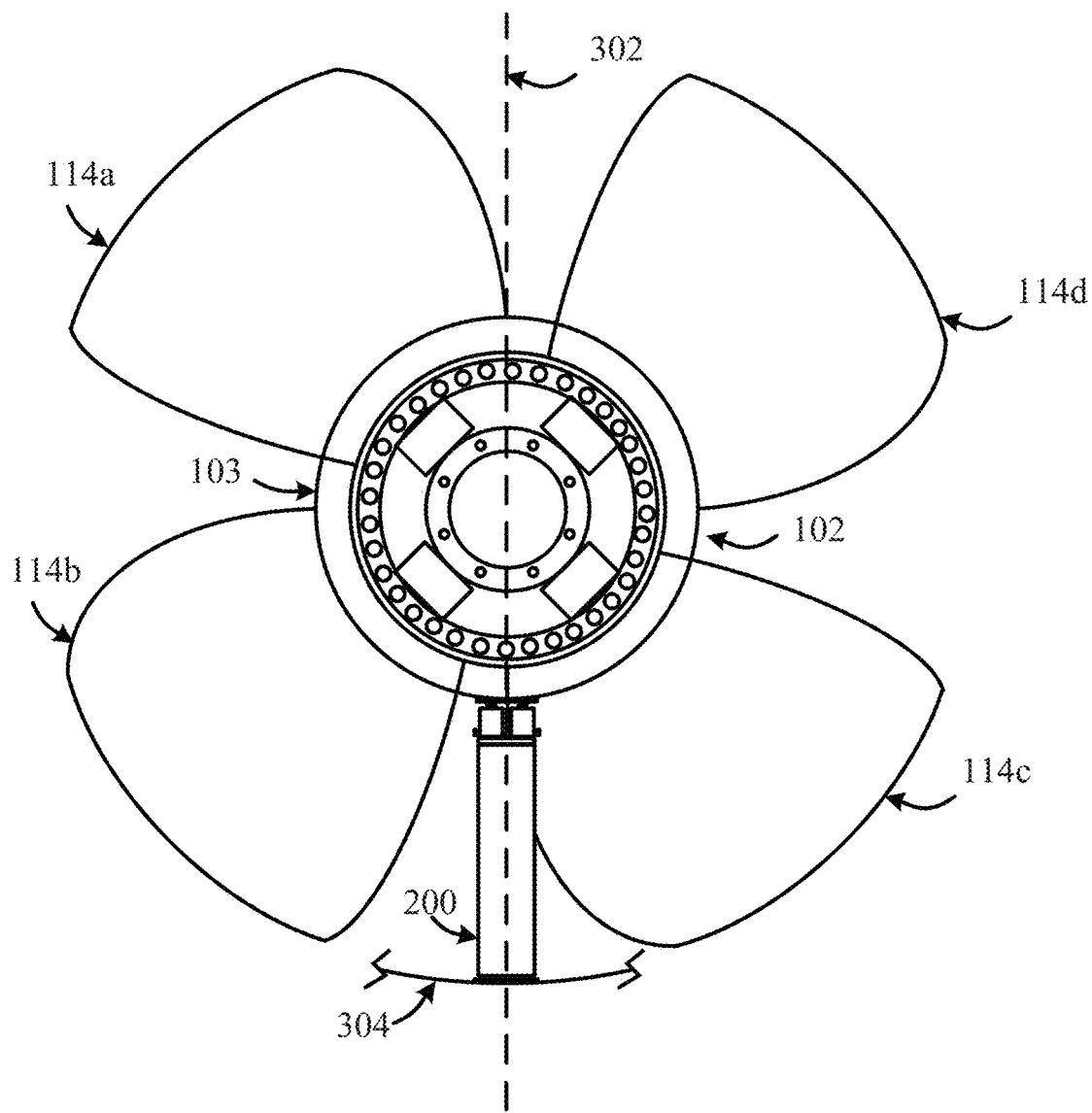
FIG. 3 is a front side view of an exemplary runner hub lifting device positioned relative to a runner hub.

FIG. 3 illustrates an exemplary runner hub lifting device 200 positioned relative to a runner hub 103. The runner 102 includes runner hub 103 and runner blades 114a-114d. The runner hub lifting device 200 may be positioned beneath the runner hub 103 so that the centerline of the runner hub lifting device and the centerline 302 of the runner hub 103 are aligned. In some examples, straps, slings, cables or other devices may be used to assist in positioning the runner hub lifting device. The bottom plate of the runner hub lifting device 200 may be welded to the discharge ring 304 surrounding the runner.

Removal of the Stub Shaft Bearing

Figure 4A:
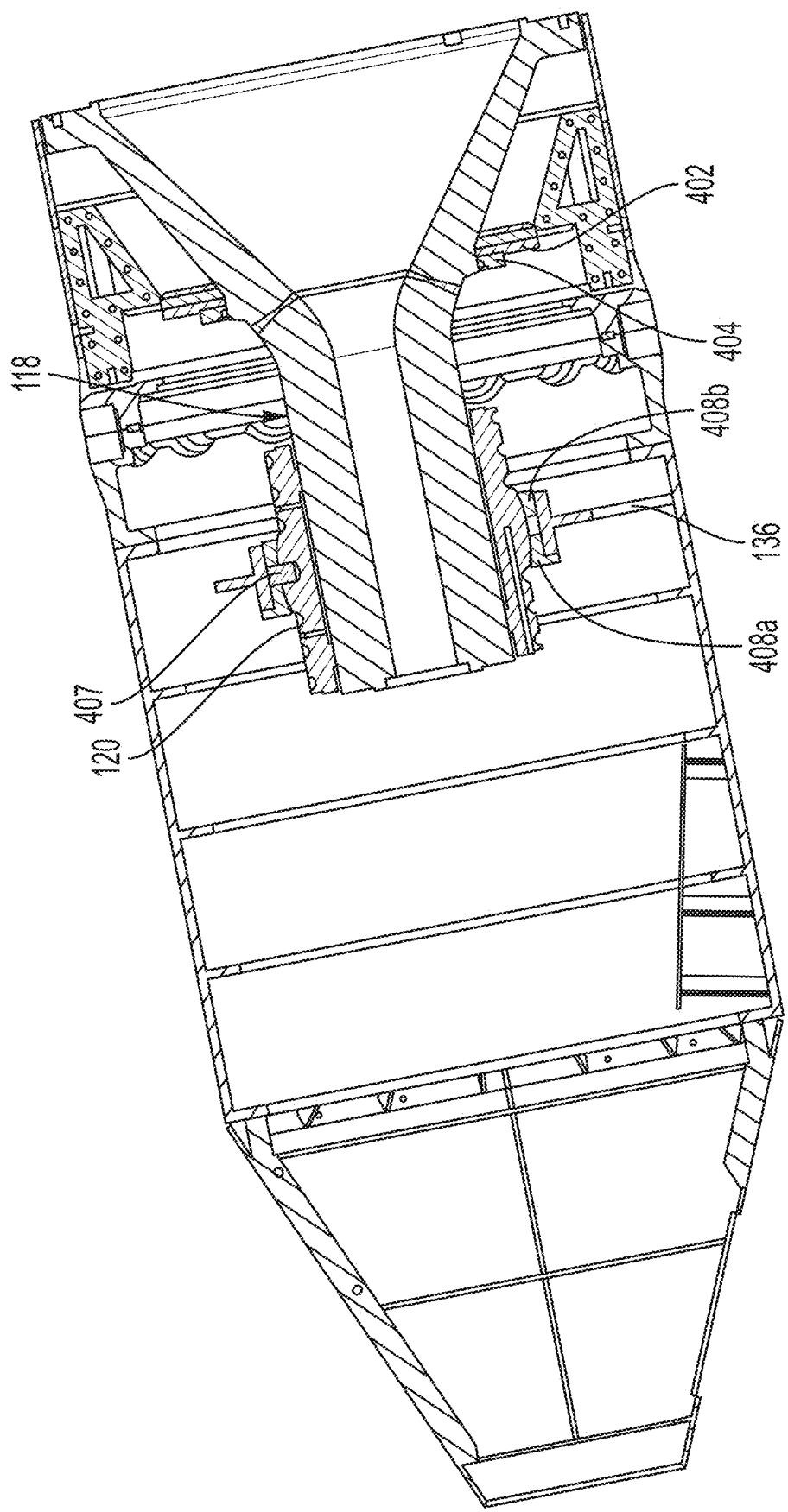
FIG. 4A illustrates an exemplary stub shaft bearing installed on a stub shaft.

Once the runner hub lifting device lifts the runner hub, the stub shaft bearing may be removed. FIGS. 4A-4D illustrate various aspects of the removal of the stub shaft bearing. FIG. 4A illustrates a cross sectional view of an exemplary stub shaft bearing 120 installed on a stub shaft 118 after removal of the oil head assembly and prior to the lifting of the runner hub by the runner hub lifting device. A stub shaft bearing retainer surrounds a portion of the stub shaft bearing and is positioned between the outer surface of the stub shaft and the stub shaft bearing support 136. The illustrated stub shaft bearing retainer includes two pieces, an upstream bearing retainer 408a and a downstream bearing retainer 408b. An alignment dowel 407 is keyed to the stub shaft bearing and the stub shaft bearing retainer. The alignment dowel prevents rotation of the stub shaft bearing. The stub shafting packing components include an adapter plate 402 and an adapter ring 404.

Figure 4B:
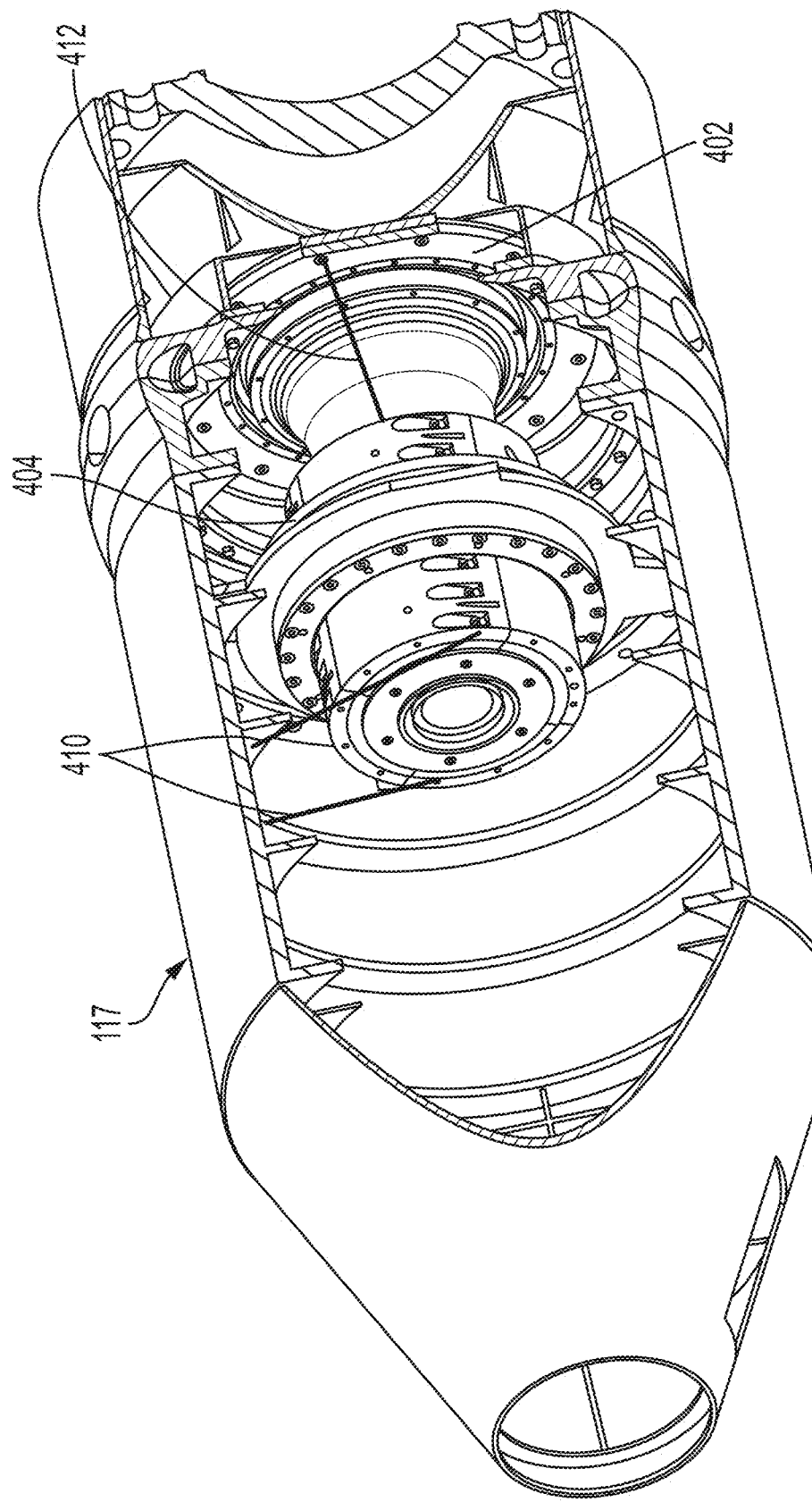
FIG. 4B illustrates an exemplary stub shaft bearing as it is being removed from a stub shaft.

The adapter ring 404 is unbolted from the adapter plate 402 and moved upstream towards the stub shaft bearing support 136. FIG. 4B illustrates the adapter ring secured to the stub shaft bearing support 136. After the runner hub lifting device lifts the runner hub, rigging 410 may be attached to the stub shaft bearing. One end of the rigging may be attached to the upstream face of the stub shaft bearing. The other end of the rigging may be attached to the upper surface of the chamber. For example, one end of the rigging may be attached to eye bolts screwed into the stub shaft bearing and the other end may be attached to lift lugs welded to the top of the chamber. Additional rigging 412 may be attached to the downstream face of the stub shaft bearing and to the adapter plate 402. For example, a mounting bolt may be removed on each side of the face of the adapter plate and the rigging may be connected to the bolt holes. Only one portion of the rigging 412 is shown in FIG. 4B.

The upstream bearing retainer 408a is attached to the stub shaft bearing 120 using lock tabs or other types of fasteners. In the example of FIGS. 4A and 4B, the upstream bearing retainer 408a is bolted to the downstream bearing retainer 408b and to the bearing support 136. The upstream bearing retainer 408a and the downstream bearing retainer 408b are separated. In the example of FIGS. 4A and 4B, the upstream bearing retainer is first unbolted from the downstream bearing retainer and then unbolted from the stub shaft bearing support. The upstream bearing retainer and the stub shaft bearing are moved in the upstream direction, assisted by gravity. The rigging between the downstream face of the stub shaft bearing and the adapter plate assists in controlling the stub shaft bearing as it is moved along the stub shaft. Once the upstream bearing retainer is clear of the stub shaft bearing support, the upstream bearing retainer is removed from the stub shaft bearing. Before the stub shaft bearing clears the stub shaft, additional rigging between the downstream face of the stub shaft bearing and the top of the chamber may be attached. After the stub shaft bearing clears the stub shaft, the rigging 412 connected to the adapter plate 402 may be disconnected.

Figure 4C:
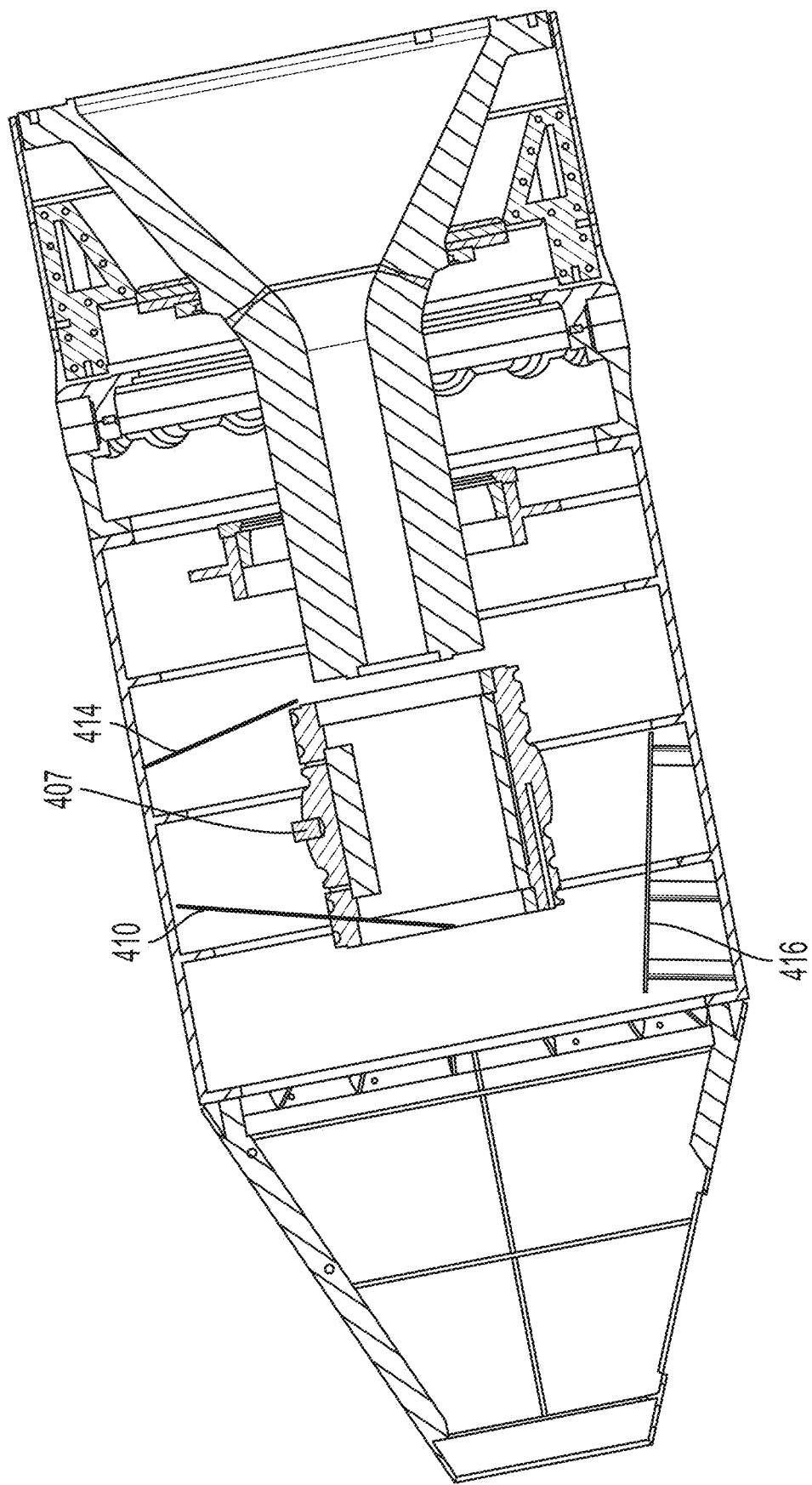
FIG. 4C illustrates an exemplary stub shaft bearing as it clears a stub shaft.

FIG. 4C illustrates the stub shaft bearing as it is removed from the stub shaft, including the additional rigging 414 between the downstream face of the stub shaft bearing and the top of the chamber. The stub shaft bearing is placed on floor plate 416 within the chamber. Rigging 410 and rigging 414 assist in moving the stub shaft bearing to the floor plate.

Figure 4D:
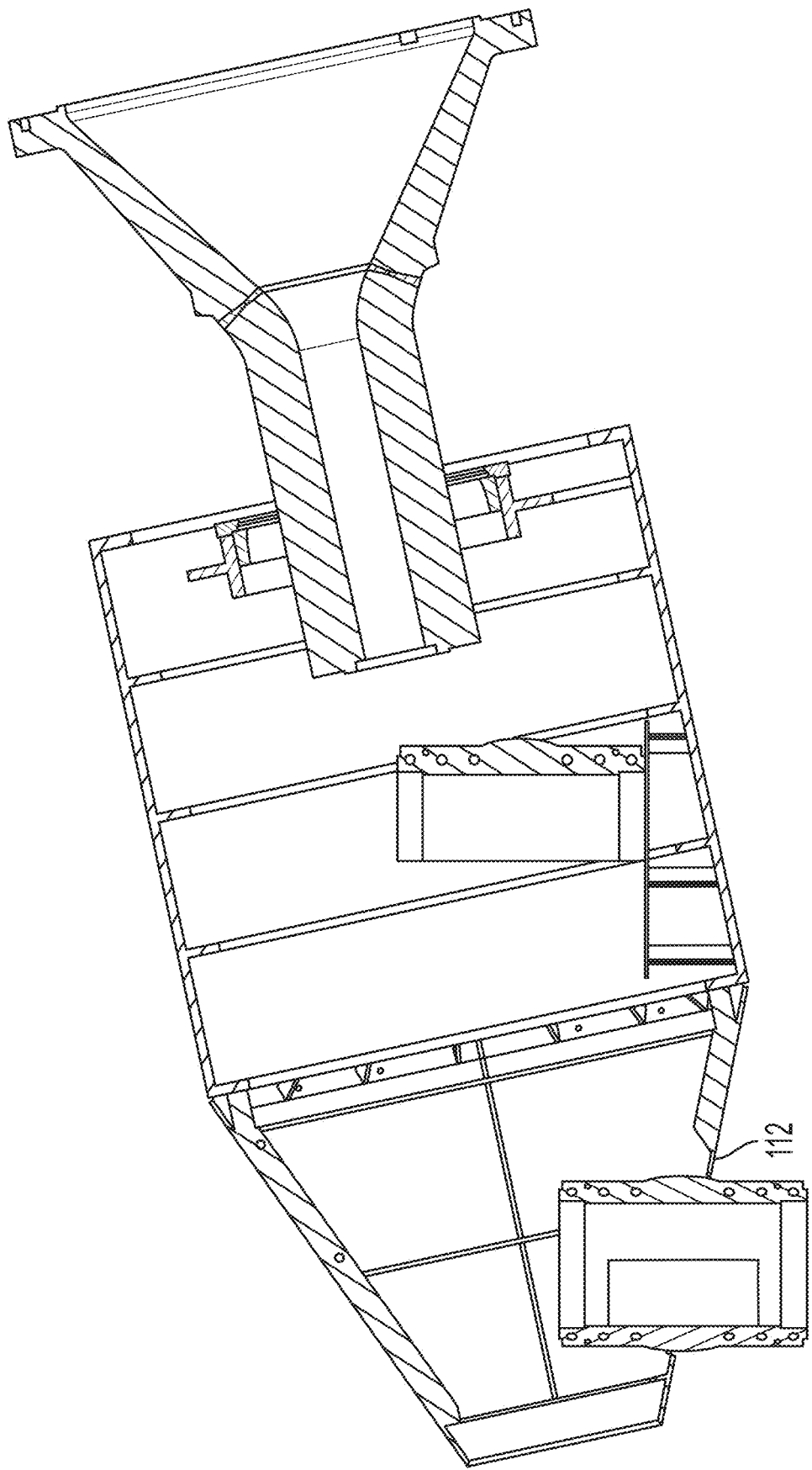
FIG. 4D illustrates exemplary sections of a stub shaft bearing.

When the stub shaft bearing includes multiple sections, the stub shaft bearing is disassembled inside the chamber and each section is moved through the service hatch and the bulkhead gate slot. FIG. 4D illustrates sections of the stub shaft bearing and how a section is moved through the service hatch 112.

The stub shaft bearing and the bearing retainer illustrated in FIGS. 4A-4C are exemplary. Other types and configurations of bearings and bearing retainers may be accommodated and may result in additional or alternative riggings or operations, or in a different sequence of operations.

Figure 5:
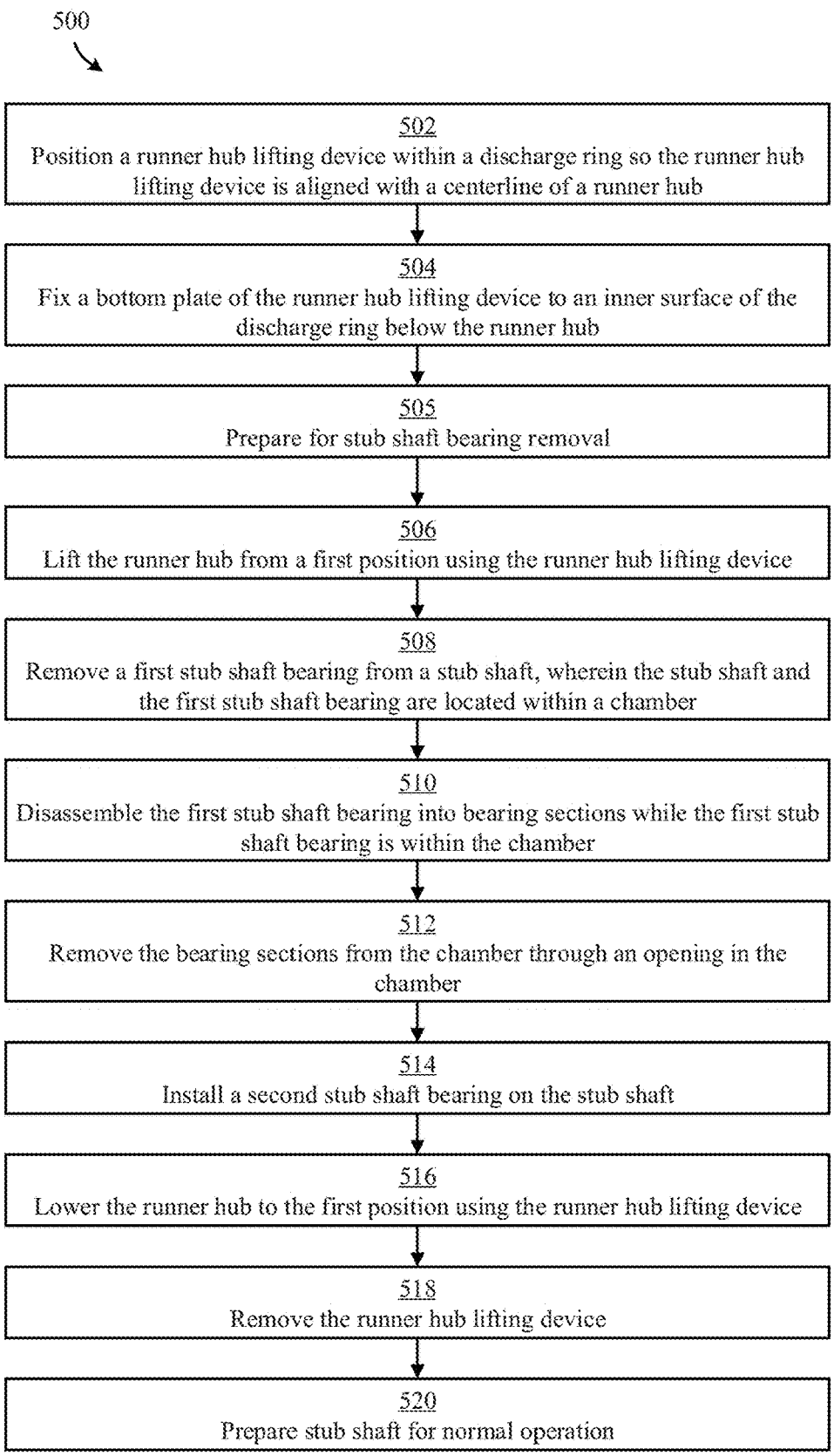
FIG. 5 is a flow diagram illustrating an exemplary method for replacing a stub shaft bearing using a runner hub lifting device.

FIG. 5 is a flow diagram showing an exemplary method 500 for removal of a stub shaft bearing using a runner hub lifting device according to some aspects of the present disclosure. The method begins after the unit is dewatered, the runner blades are rotated into an X position so that the lower two runner blades straddle a centerline of the runner hub, and any other preparations are completed. Examples of other preparations that may be needed include draining oil from the runner hub and the runner blade servomotor oil lines.

In block 502, a runner hub lifting device is positioned within the discharge ring such that a centerline of the runner hub lifting device is aligned with a centerline of a runner hub. Straps or other devices may be used to assist with the positioning of the runner hub lifting device. The runner hub lifting device may be moved into the discharge ring through a service hatch in the discharge ring. In some implementations, the runner hub lifting device may be moved into the discharge ring in pieces and assembled within the discharge ring.

Once the runner hub lifting device is in position, then in block 504 the bottom plate of the runner hub lifting device is fixed to the inner surface of the discharge ring. In some cases, the bottom plate can be welded to the discharge ring. When the bottom plate is welded to the discharge ring, additional bars may be welded to both sides of the bottom plate and to the wear band of the discharge ring. After the runner hub lifting device is fixed to the discharge ring, the hydraulic rams are extended so that the hub support plate contacts the runner hub.

Although FIG. 5 illustrates that block 505 may follow block 504, block 505 may be performed in parallel with blocks 502 and 504. In block 505 the stub shaft and the chamber are prepared for the removal of the stub shaft bearing. The preparation of the stub shaft may include removing electrical instruments and devices from the oil head assembly and stub shaft bearing, removing hoses and piping from the oil head and bearing covers, and removing the oil head assembly, as well as other actions. It may also include unbolting and moving the adapter ring upstream and securing it to the stub shaft bearing support. The preparation of the stub shaft chamber may include installing additional floor plates to the interior of the chamber and welding lifting lugs to the top of the chamber.

In block 506, the runner hub is lifted from a first position where the stub shaft bearing supports the load of the hydroelectric turbine to a second position where the runner hub lifting device supports the load. To lift the runner hub, the hydraulic rams in the runner hub lifting device may use pressurized hydraulic fluid to apply force upwards to raise and support the runner. After lifting the runner hub, hub supports such as rods and L-shaped brackets may be placed between the ram base plate and the hub support plate of the runner hub lifting device to help maintain the lifted position. In addition, wedges or other stabilizing devices may be placed between the lower runner blades and the discharge ring to prevent lateral movement of the runner.

In block 508, the stub shaft bearing is removed from a stub shaft while the runner hub is lifted by the runner hub lifting device. As discussed above in connection with FIGS. 4B and 4C, the steps to remove the stub shaft bearing may include the installation of riggings and the removal of the upstream bearing retainer.

In block 510, the stub shaft bearing is disassembled into bearing sections while the stub shaft bearing is within the chamber. For example, the stub shaft bearing may be disassembled into bearing sections by removing bolts that hold the sections together while the stub shaft bearing is positioned on the floor plate.

In block 512, the bearing sections are removed from the chamber through the service hatch. In some examples, the bearing sections may be removed through the bulkhead gate slot after being removed from the chamber.

In block 514, a new stub shaft bearing is installed on the stub shaft. In some examples, the new stub shaft bearing may be installed by reversing the steps used to remove the stub shaft bearing. For example, the sections of the new stub shaft bearing may be moved into the chamber. The sections may be assembled inside the chamber so that the assembled stub shaft retainer sits on the floor plate. Rigging may be attached to the upstream and downstream faces of the stub shaft bearing and the stub shaft bearing may be moved towards the stub shaft. Once the stub shaft bearing is on the end of the stub shaft, additional rigging may be attached to the downstream face of the bearing and to the adapter plate. The rigging between the downstream face of the bearing and the top of the chamber may be removed.

The upstream bearing retainer is installed around the stub shaft bearing. The stub shaft bearing and upstream bearing retainer continue to slide along the stub shaft in a downstream direction. When the upstream bearing retainer contacts the stub shaft bearing support and the downstream bearing retainer, the upstream and downstream bearing retainers are connected. After connecting the upstream and downstream bearing retainers, the upstream bearing retainer is connected to the stub shaft bearing support. The rigging may be removed from the stub shaft bearing.

In block 516, the runner hub is lowered to the first position using the runner hub lifting device. Any rods or L-shaped brackets are removed prior to lowering the hydraulic rams. The runner hub lifting device may return the runner hub to the first position. Any straps or stabilizing devices may be removed.

In block 518, the runner hub lifting device is removed from the discharge ring.

In block 520, the stub shaft and the chamber are restored to their operational conditions. This may include reinstalling the oil head assembly, electrical instruments and devices, hoses and piping, as well as other actions. It may also include moving the adapter ring downstream and reconnecting it to the adapter plate, removal of any additional floor plates, or removal of the lifting lugs and rigging. Block 520 may follow block 518, be performed in parallel with block 518 or precede block 518.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for lifting a runner hub installed in a hydroelectric unit using a runner hub lifting device, comprising:

moving the runner hub lifting device into a discharge ring of the hydroelectric unit, wherein the discharge ring surrounds a runner including the runner hub;

positioning the runner hub lifting device within the discharge ring so that a centerline of the runner hub lifting device is aligned with a centerline of the runner hub;

activating at least one hydraulic ram of the runner hub lifting device so that a hub support plate of the runner hub lifting device moves towards the runner hub and the hub support plate contacts the runner hub, wherein a top surface of the hub support plate is curved to match a curve of the runner hub;

fixing a bottom plate of the runner hub lifting device to an inner surface of the discharge ring below the runner hub; and further activating the at least one hydraulic ram of the runner hub lifting device to lift the runner hub from a first position to a second position, wherein the runner hub lifting device includes at least one base support mounted to the bottom plate, a ram base plate mounted to an end of the base support opposite the bottom plate, the at least one hydraulic ram mounted on the ram base plate, and the hub support plate mounted to the at least one hydraulic ram opposite the ram base plate, wherein the runner hub lifting device further comprises at least one hub support, and wherein the method further comprises inserting the at least one hub support between the ram base plate and the hub support plate when the runner hub reaches the second position.

2. The method of claim 1, wherein the hub supports are rods or L-shaped brackets.

3. The method of claim 1, wherein the ram base plate is rectangular and the hub supports are inserted at each corner of the ram base plate.

4. The method of claim 1, further comprising:

prior to positioning the runner hub lifting device within the discharge ring, rotating runner blades of the runner hub into a position where the runner blades straddle the centerline of the runner hub.

* * * * *